(12) United States Patent
Lindig et al.

(10) Patent No.: US 6,912,892 B2
(45) Date of Patent: Jul. 5, 2005

(54) ATOMIC FORCE MICROSCOPE

(75) Inventors: Darin D. Lindig, Meridian, ID (US); Anthony P. Holden, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/136,766

(22) Filed: Apr. 30, 2002

(65) Prior Publication Data

US 2003/0200798 A1 Oct. 30, 2003

(51) Int. Cl.[7] .......................... G01N 13/16; G01B 7/34; G12B 21/08
(52) U.S. Cl. ....................................................... 73/105
(58) Field of Search ..................... 73/105; 250/306–307

(56) References Cited

U.S. PATENT DOCUMENTS

| | | | | |
|---|---|---|---|---|
| 4,935,634 A | * | 6/1990 | Hansma et al. | 250/306 X |
| 5,025,658 A | * | 6/1991 | Elings et al. | 73/105 |
| 5,144,833 A | * | 9/1992 | Amer et al. | 73/105 |
| 5,449,903 A | * | 9/1995 | Arney et al. | 250/306 |
| 5,540,958 A | * | 7/1996 | Bothra et al. | 427/535 |
| 5,546,374 A | * | 8/1996 | Kuroda et al. | 250/306 X |
| 6,196,061 B1 | * | 3/2001 | Adderton et al. | 73/105 |
| 6,211,685 B1 | * | 4/2001 | Stanford et al. | 324/716 |
| 6,366,340 B1 | * | 4/2002 | Ishibashi et al. | 355/69 |
| 2002/0101573 A1 | * | 8/2002 | Ishibashi et al. | 355/69 |

* cited by examiner

*Primary Examiner*—Thomas P. Noland
(74) *Attorney, Agent, or Firm*—Matthew L. Wade

(57) ABSTRACT

An atomic force microscope for examining a sample is described. The atomic force microscope includes a probe assembly that includes a first tip and a second tip each directed towards a surface of a sample. The AFM further includes a source for applying a potential across the first tip and the second tip; at least one mechanism operable to cause relative motion between the surface and the probe; and at least one sensor operable to sense current flowing between the first tip and the second tip.

6 Claims, 14 Drawing Sheets

ATOMIC FORCE MICROSCOPE

BACKGROUND

Atomic force microscopes (AFMs) are high-resolution surface measurement instruments. The construction of a typical AFM is described in detail in several U.S. patents, including U.S. Pat. No. 4,935,634 to Hansma et al, U.S. Pat. No. 5,025,658 to Elings et al, and U.S. Pat. No. 5,144,833 to Amer et al.

The typical AFM includes a probe that has a cantilever and a single probe tip extending from the cantilever. In order to measure the topography of the surface of a sample, for example, the AFM scans the probe with respect to the surface. The scanning motion can be produced by translating either the sample or the probe.

As the probe is scanned over the surface, atomic forces interact with the probe tip and cause the cantilever to deflect. By measuring the deflection of the cantilever as a function of probe position with respect to the surface, a three dimensional map of the surface can be created.

In addition to measuring surface topography, AFM's are often used to perform other types of tasks. For example, AFM's can be used to measure conductivity variations across very small areas in a sample. This type of measurement may be referred to as a "conductive AFM measurement". A "tunneling AFM measurement" (which uses very low currents) is considered herein as a special type of C-AFM measurement.

Because of their resolution and versatility, AFM's are important measurement instruments and have found uses in many diverse fields ranging from semi-conductor analysis to biological research.

It would be desirable, however, to expand the functionality of AFM'S. It would also be desirable to increase the utility and accuracy of AFM measurements.

SUMMARY

According to one embodiment, for example, the invention provides a method. The method may be performed in an atomic force microscope. The method may include providing a probe assembly including a first tip and a second tip; providing relative motion between the probe and sample so that the first tip and the second tip approach a target area of a sample; sensing a change in electrical resistance between the first tip and the second tip as a result of the first tip and the second tip contacting the target area; and performing the task after the change has been detected.

DESCRIPTION

Figure 1:
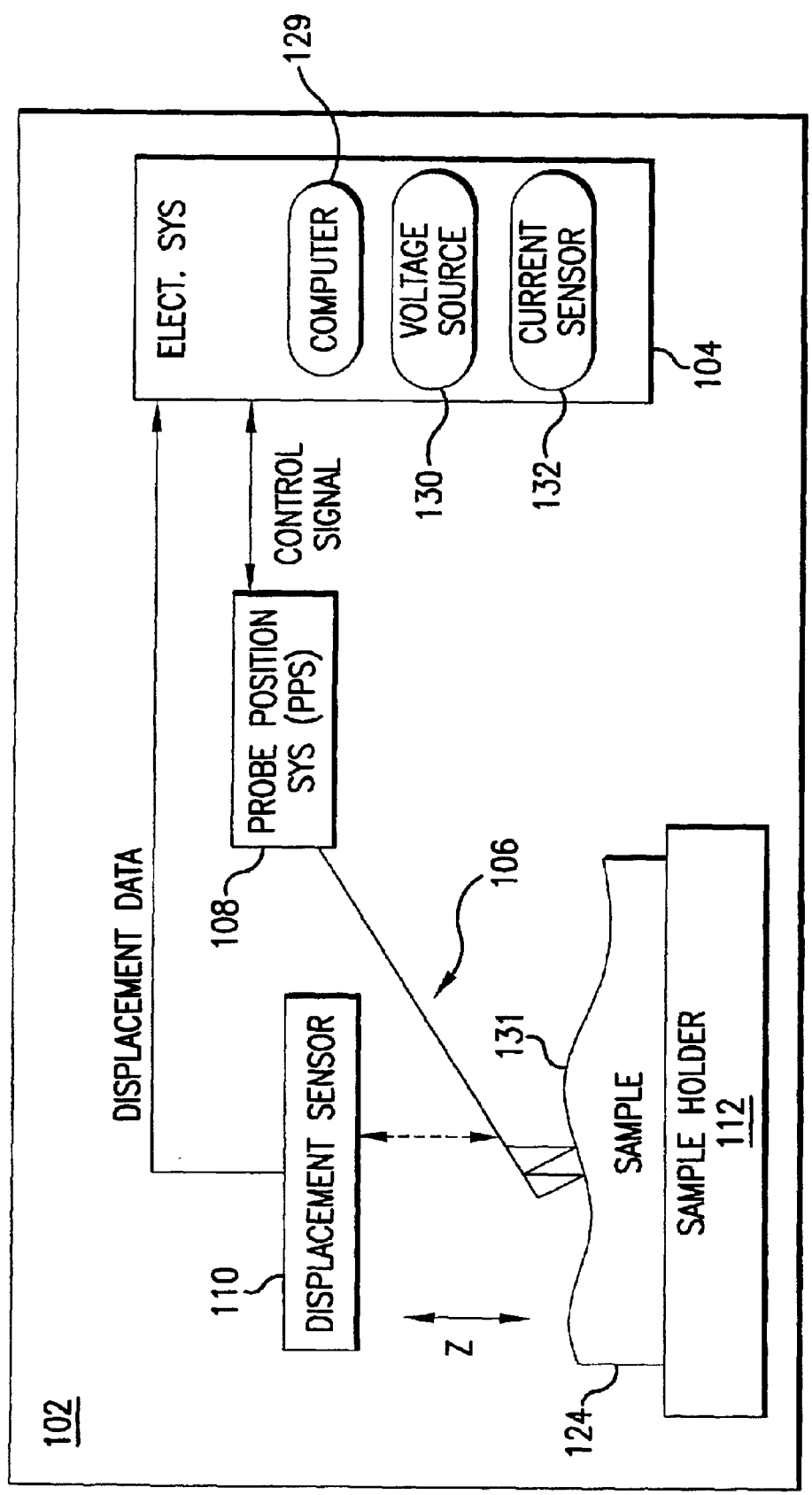
FIG. 1 is a high-level block diagram of an AFM system in accordance with one embodiment of the invention.

FIG. 1 is a high-level block diagram of an AFM 102 that is in accordance with one embodiment of the invention. The AFM 102 includes, in this example, an electronic system 104, a multi-tip probe 106, a probe positioning system (PPS) 108 and a cantilever displacement sensor 110.

The electronic system 104 includes a computer 129, a voltage source 130 and a current sensor 132. The computer 129 controls the operation of the AFM 102 and functions to receive and store data that is generated by the AFM 102. The computer 129 also may provide a user interface to the user. As is discussed in greater detail below, the computer 129 makes use of the voltage source 130 and the current sensor 132 to perform certain tests and measurements.

The sample holder 112 is used to fix a sample that is being investigated by the AFM 102. In the following discussion, it is assumed that a sample 124 is presently fixed to the holder 112.

The PPS 108 is used to position the probe 106 relative to the sample 124 and may include, for example, a piezoelectric type scanner. Other types of scanning mechanisms, however, may be used. The PPS 108 may also include, for example, a mechanism for oscillating the probe 106 during a scanning operation.

The displacement sensor 110 is used to measure the deflection of the probe's cantilever arm of the AFM probe 106 during a scanning operation. The data that is generated by the displacement sensor 110 is transmitted to the computer 129 where it may then be stored and/or displayed to the user.

Construction of the Probe 106

Figure 2:
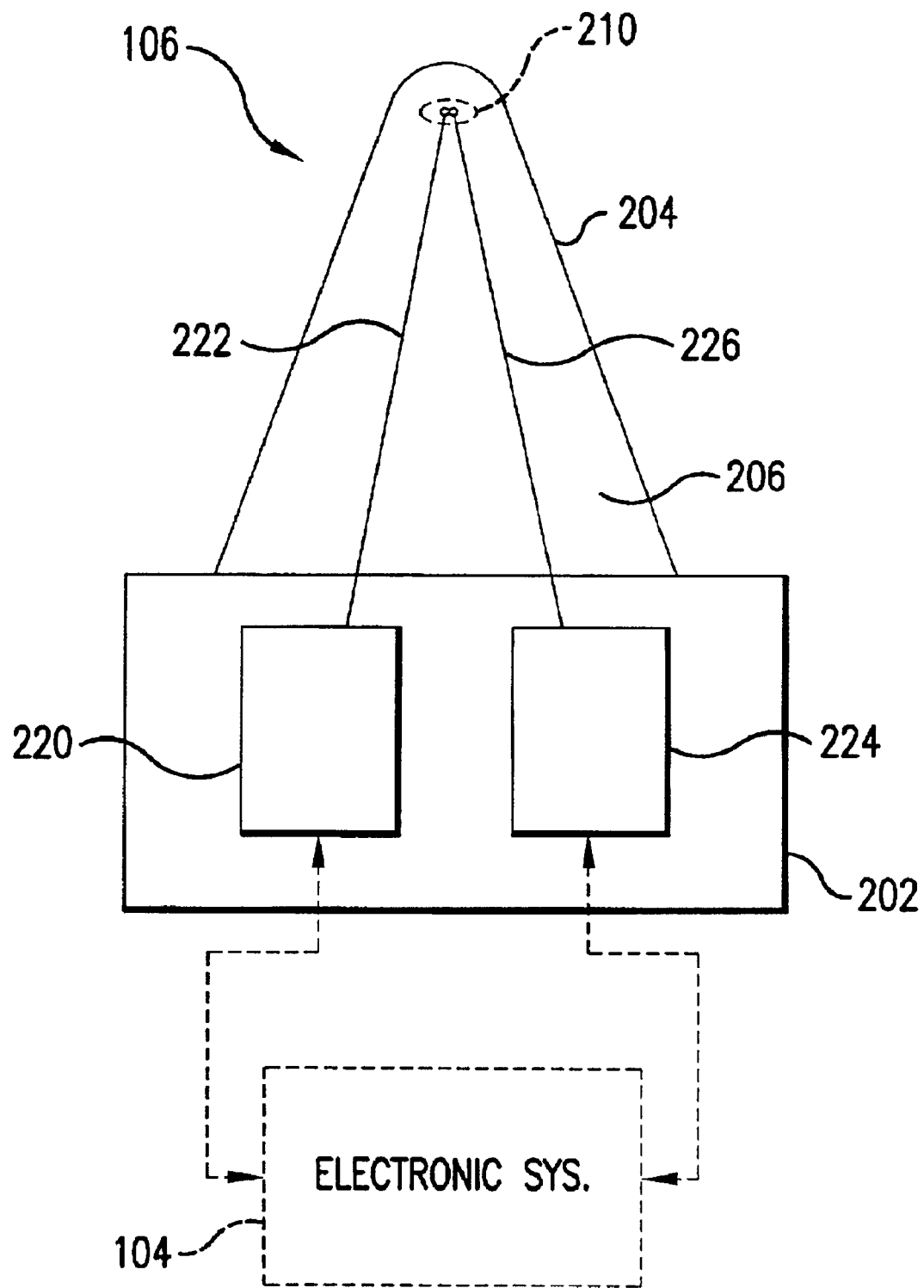
FIG. 2 is a simplified view of a multi-tip probe in accordance with one embodiment of the invention.

FIG. 2 is a simplified view of the multi-tip probe 106. As shown in FIG. 2, the multi-tip probe 106 includes a base section 202 and a bendable cantilever arm 204. The cantilever arm 204 has a spring constant that is suitable for atomic force microscope applications.

The cantilever arm 204 includes a surface 206 that faces the sample surface 131 during a scanning operation. Extending from the surface 206, at the distal end, are two probe tips 210. It is noted that in other embodiments, an AFM probe according to the invention may include more than two probe tips.

Figure 3:
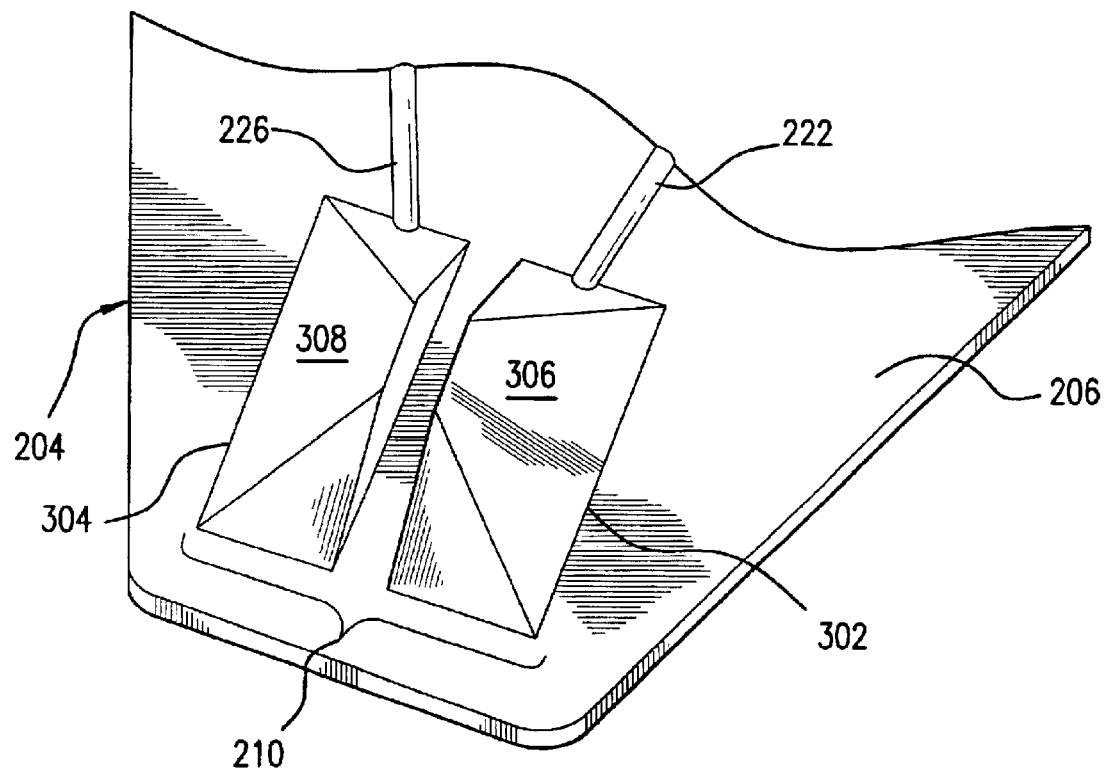
FIG. 3 depicts an enlarged view of the multi-tip probe.

FIG. 3 provides an enlarged view of the two probe tips 210. As shown in FIG. 3, the two probe tips 210 includes a first tip 302 and a second tip 304.

Preferably, the two probe tips 210 each have an outer surface that is electrically conductive. Thus, the first tip 302 has an outer conductive surface (first tip surface) 306 and the second tip 304 also has an outer conductive surface (second tip surface) 308. Preferably, the two tips 210 are constructed and arranged so that the first tip surface 306 is electrically isolated from the second tip surface 308. According to one specific implementation, the two tips surfaces are constructed of platinum or a platinum alloy. Other materials, however, may be used.

In this example, the two tips 210 are each electrically connected to the electronic system 104 so as to:

(1) Enable the voltage source 130 to impress a voltage across the first tip surface 306 and the second tip surface 308; and (2) Enable the current sensor 132 to measure the current (if any) flowing between the first tip surface 306 and the second tip surface 308.

In this embodiment, the first tip surface 306 is electrically connected to a first contact pad 220 via a conductive trace 222 that runs along the cantilever arm 204. Similarly, the second tip surface 308 is electrically connected to a second contact pad 224 via a second conductive trace 226. The electronic system 104, in turn, is appropriately connected to the first contact pad 220 and the second contact pad 224.

It is noted, however, that other ways may be used to electrically connect the two tips 210 to the electronic system 104.

Surface Topography Measurements

One use of the AFM 102 is to measure the topography of the sample surface 131. In order to perform this measurement, the computer 129 transmits appropriate control signals to the PPS 108. The PPS 108 responds to these signals by scanning the probe 106 over the surface 131. As the probe 106 is scanned over the surface 131, atomic forces interact with the two tips 210. This interaction causes the cantilever arm 204 to deflect. The displacement sensor 110 measures the deflection and transmits this information to the computer 129.

The computer 129 receives this information and generates data (topography data) that describes the topography of the surface 131. The computer 129 may store and/or display this data to the user.

Other Tasks

In addition to measuring surface topography, the AFM 102 can also be used to perform other tasks. For example, the AFM 102 may be used to perform conductive AFM measurements, surface temperature measurements, etc.

For some of these tasks, it is desirable that the two tips 210 be in contact with a target area on the sample 124 when the task is performed.

Figure 4:
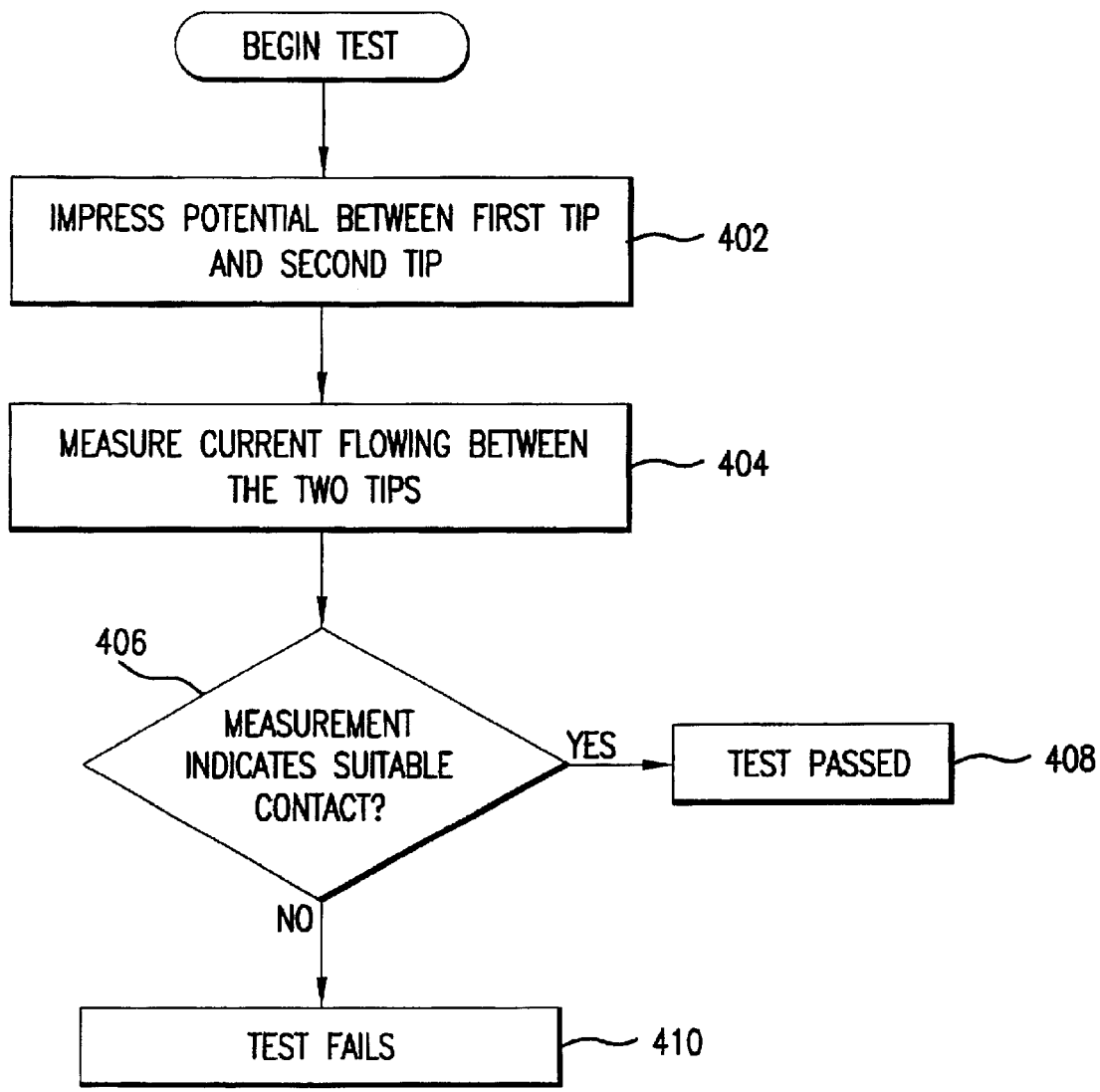
FIG. 4 is a flow diagram illustrating how the AFM system can operate to perform a test.

FIG. 4 is a flow diagram illustrating how the AFM 102 can perform a "contact verification (CV) test" in order to determine if the two tips 210 are in suitable contact with a target area on the sample 124 in order to perform a particular task.

Referring now to FIG. 4, the computer 129 causes the voltage source 130 to impress a voltage across the first tip surface 306 and the second tip surface 308 (step 402). Next, the computer 129 uses the current sensor 132 to measure the current flowing between the two tips 210 (step 404).

If the measured current meets one or more criteria, it is determined that the two tips 210 are in suitable contact with the target area to perform the task (step 406, 408). Thus, the CV test was successful.

If, however, the measured current does not meet one or more criteria, it is determined that the two tips 210 are not in suitable contact with the target area to perform the task (step 406, 410). Thus, the CV test fails.

Non-Limiting Example

To illustrate one example of how the steps depicted in FIG. 4 may be performed in a specific implementation, consider the following non-limiting example. In this example, the following is assumed:

(1) the sample 124 includes a set of Magnetic Resistive Random Access Memory (MRAM) storage cells; and (2) the user wishes to perform a conductive AFM measurement upon a particular one of the memory cells: memory cell "A".

Figure 5:
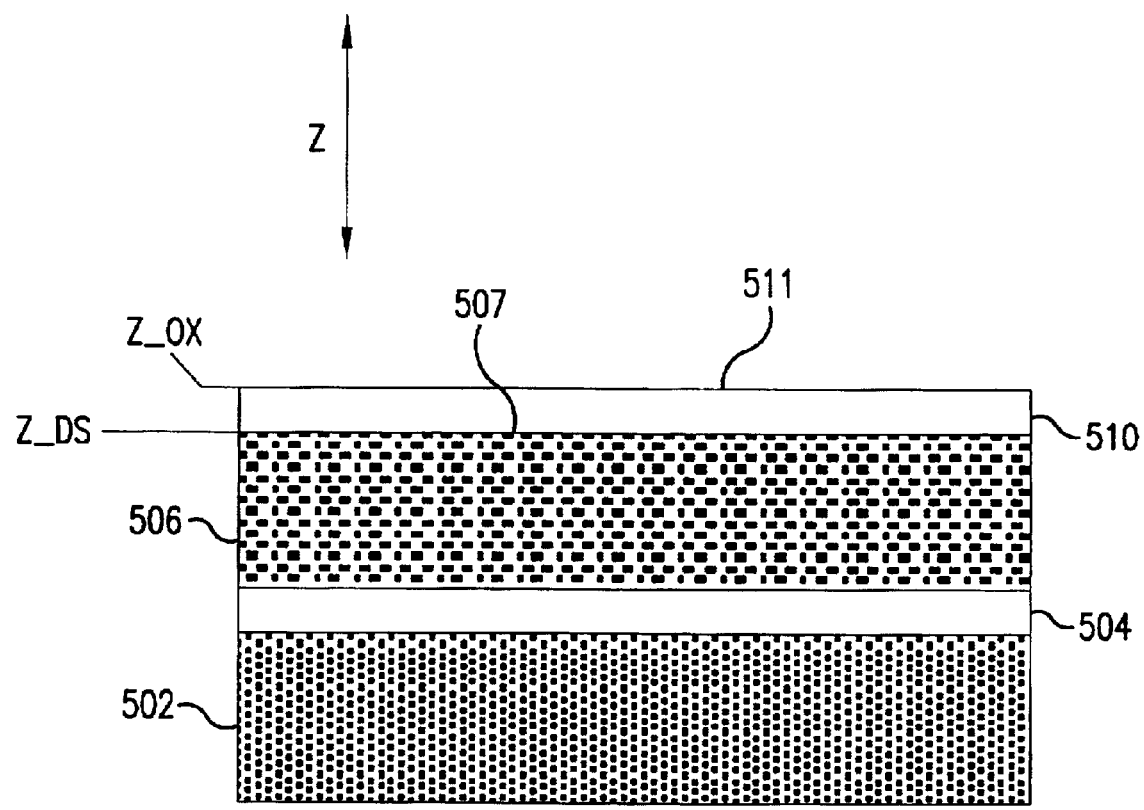
FIG. 5 shows a cross-sectional view of an MRAM memory cell.

FIG. 5 depicts a simplified cross-sectional view of memory cell "A". Memory cell "A", in this example, includes a reference layer 502, a tunnel barrier 504 and a data storage layer 506. Further details regarding the function of these layers and the operation of an MRAM memory cell is described in U.S. Pat. No. 5,982,660. U.S. Pat. No. 5,982,660 is incorporated herein by reference.

In this non-limiting example, it is further assumed that:

(3) a poorly conductive contamination layer, metal oxide layer 510, presently covers the upper surface 507 of the storage layer 506;

(4) the X-Y coordinate of the data storage layer 506 is known within an acceptable level of accuracy;

(5) the Z coordinate (Z_DS) of the data storage layer surface 507 is not known with certainty; and (6) it is desirable to perform the conductive AFM measurement with the two tips 210 in contact with the data storage layer surface 507.

It is noted that one possible reason the value of "Z_DS" is not known with certainty is due to the presence of the metal oxide layer 510. For example, if the metal oxide layer 510 was present when the topography of memory cell "A" was measured, the resulting topography data may indicate that the upper surface of memory cell "A" has a Z coordinate of "Z_OX" (see FIG. 5). Wherein "Z_OX" is the Z coordinate of the upper surface 511 of the oxide layer 510.

Figure 6A:
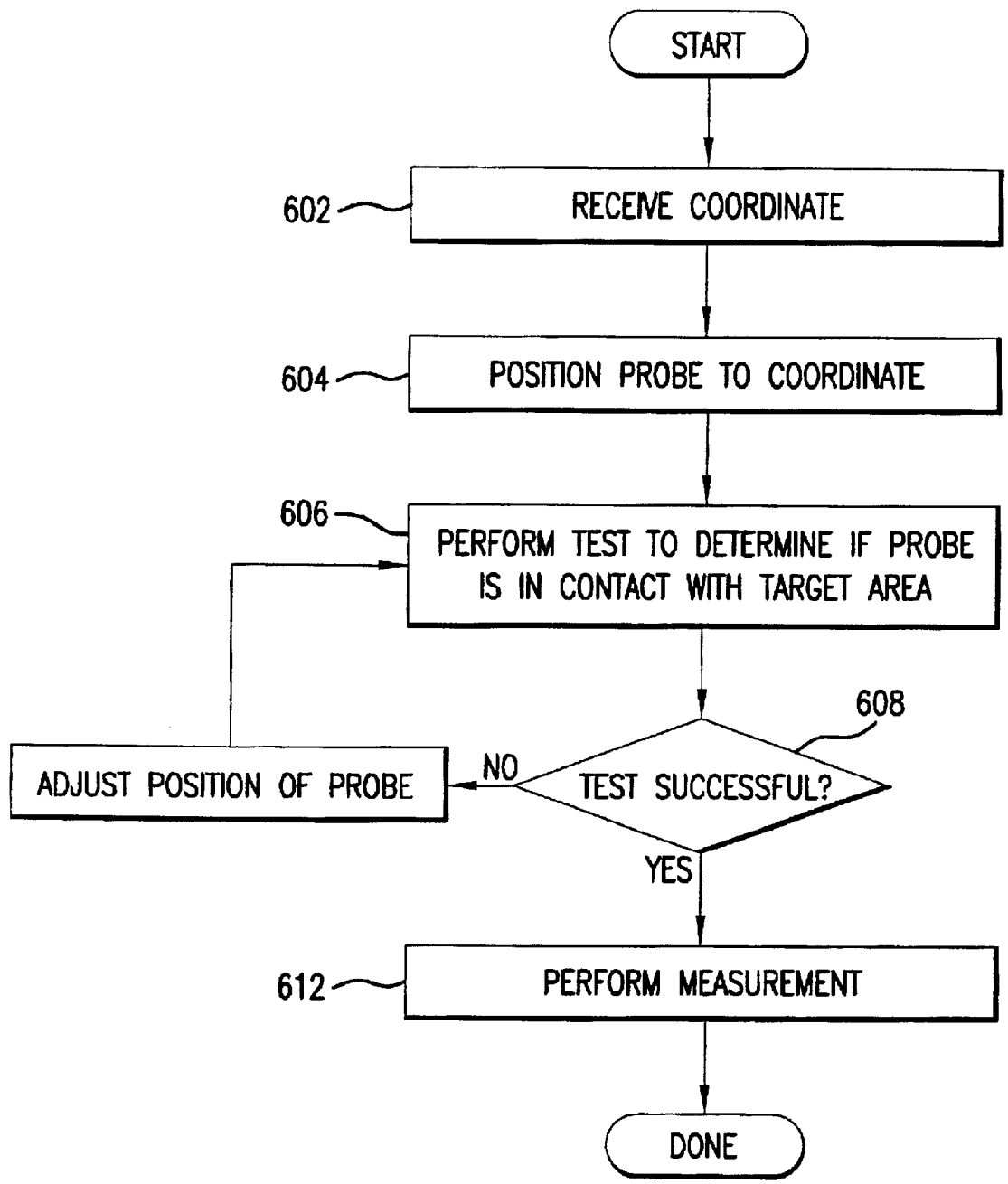
FIG. 6A is a flow diagram illustrating how the AFM can operate to position a probe according to one illustrative example.

FIG. 6A is a flow diagram illustrating how the AFM 102 can operate to position the probe 106 to the data storage layer surface 507 to perform a conductive AFM measurement. Referring now to FIG. 6A, a user of the AFM 102 inputs an X-Y-Z coordinate (coordinate "A"). The computer 129 receives this user input at step 602. The user input describes the X and Y coordinate of the data storage layer 507 within and acceptable level of accuracy. As indicated above, however, the accuracy of the Z coordinate is uncertain.

In response to the user input, the computer 129 positions the two tips 210 to coordinate "A" (step 604). Next, the computer 129 performs a version of the CV test described above in order to determine if the two tips 210 are in suitable contact with the data storage layer surface 507 to perform the conductive AFM measurement (step 606).

If the CV test indicates the two tips 210 are not in suitable contact (i.e., the test fails), then the position of the probe 106 is adjusted (step 608, 610). In this example, if the CV test fails, the Z distance between the two tips 210 and the storage layer surface 507 is reduced and the CV test is again performed. This process continues until the CV test is successful.

Once the CV test is successful, the probe 106 is considered to be in a suitable position to perform the conductive AFM measurement. At step 612, the conductive AFM measurement is performed.

Figure 6B:
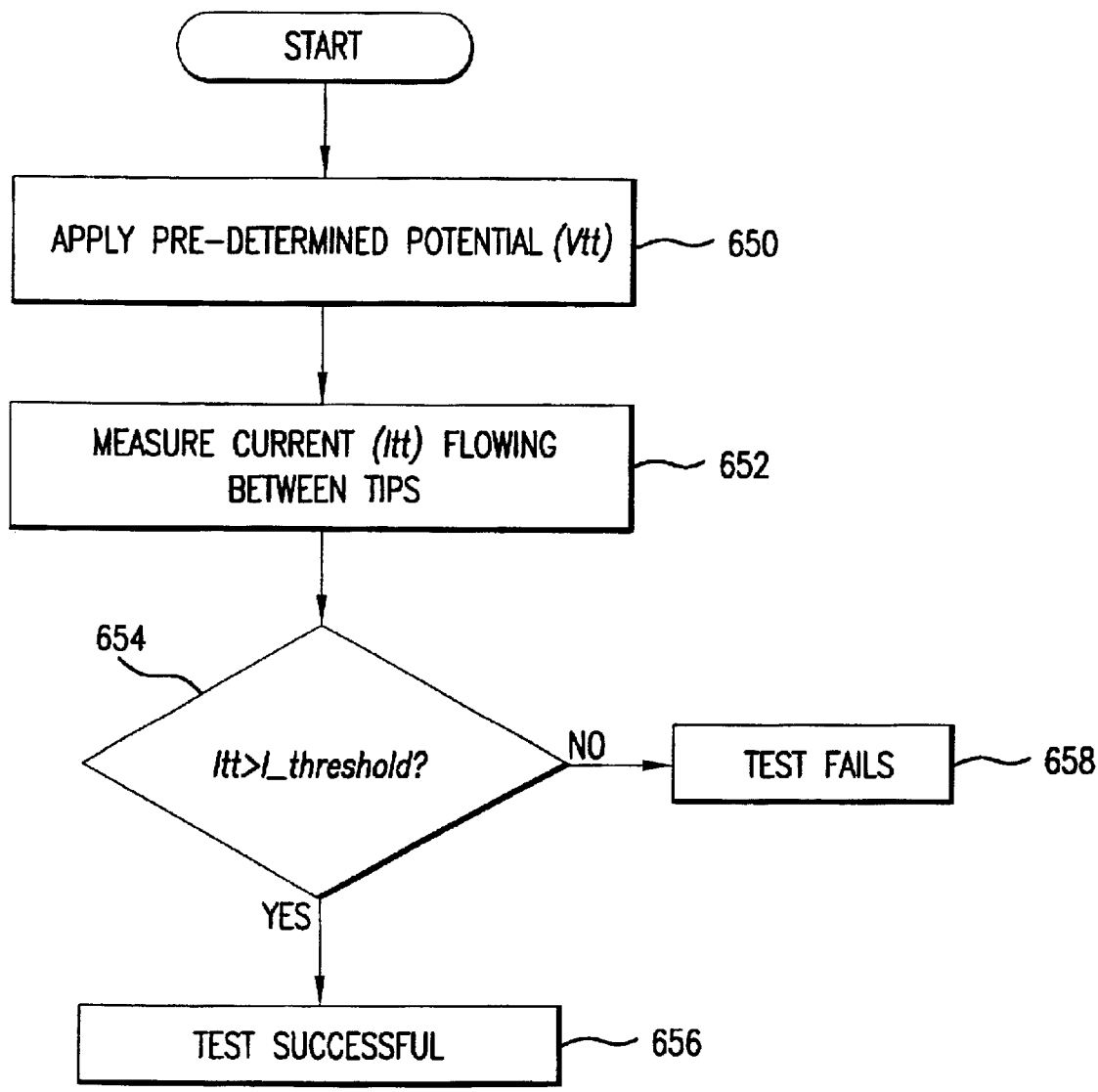
FIG. 6B is a flow diagram illustrating how the AFM can perform a test in one illustrative example.

FIG. 6B is a flow diagram illustrating how the CV test may be performed in this example. Referring to FIG. 6B, the computer 129 causes a pre-determined potential (Vtt) to be applied between the first tip surface and the second tip surface (step 650). Next, the computer 129 measures the level of current (Itt) flowing between the two tips 210 (step 652). If the level of current (Itt) flowing between the two tips 210 is above a threshold value (Ithresh), the CV test is considered successful (step 654 and step 656). If, however, Itt is less than Ithresh, then the CV test fails (step 654 and step 658).

Figure 7:
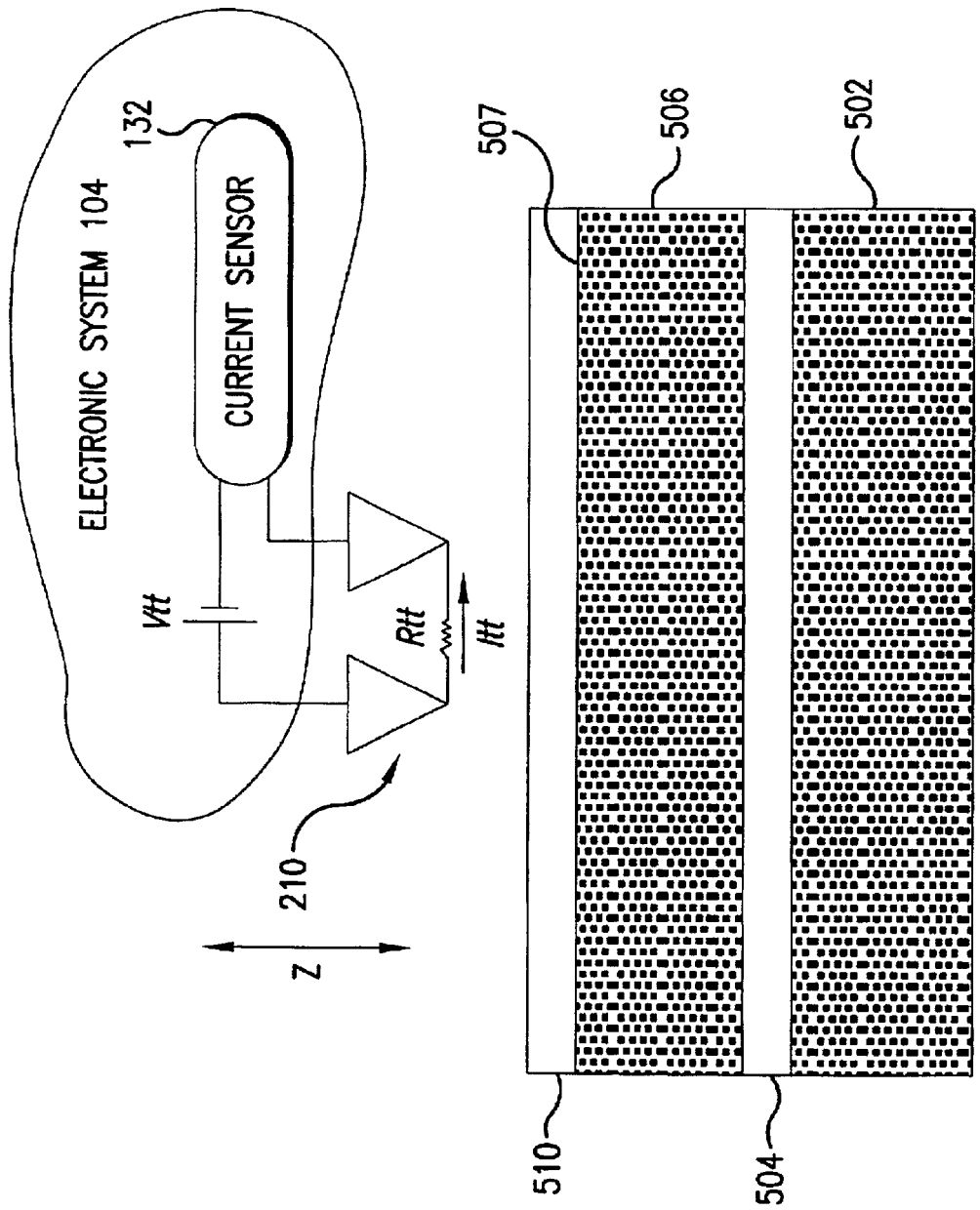
FIG. 7 illustrates, schematically, a possible position of the probe tips with respect to the MRAM memory cell.

FIG. 7 illustrates, schematically, a possible position of the two tips 210 (the rest of the probe 106 is not shown) when a CV test is performed in the present example. "Rtt" represents the resistance between the two tips 210.

It is noted that, in this example, the value of I_thresh may be determined using predicted values of Rtt when the two tips 210 are:

(a) located above the oxide layer 510;
(b) in contact with the oxide layer 510, but not in contact with the data storage layer's upper surface 507; and
(c) in contact with the data storage surface 507.

Figure 8:
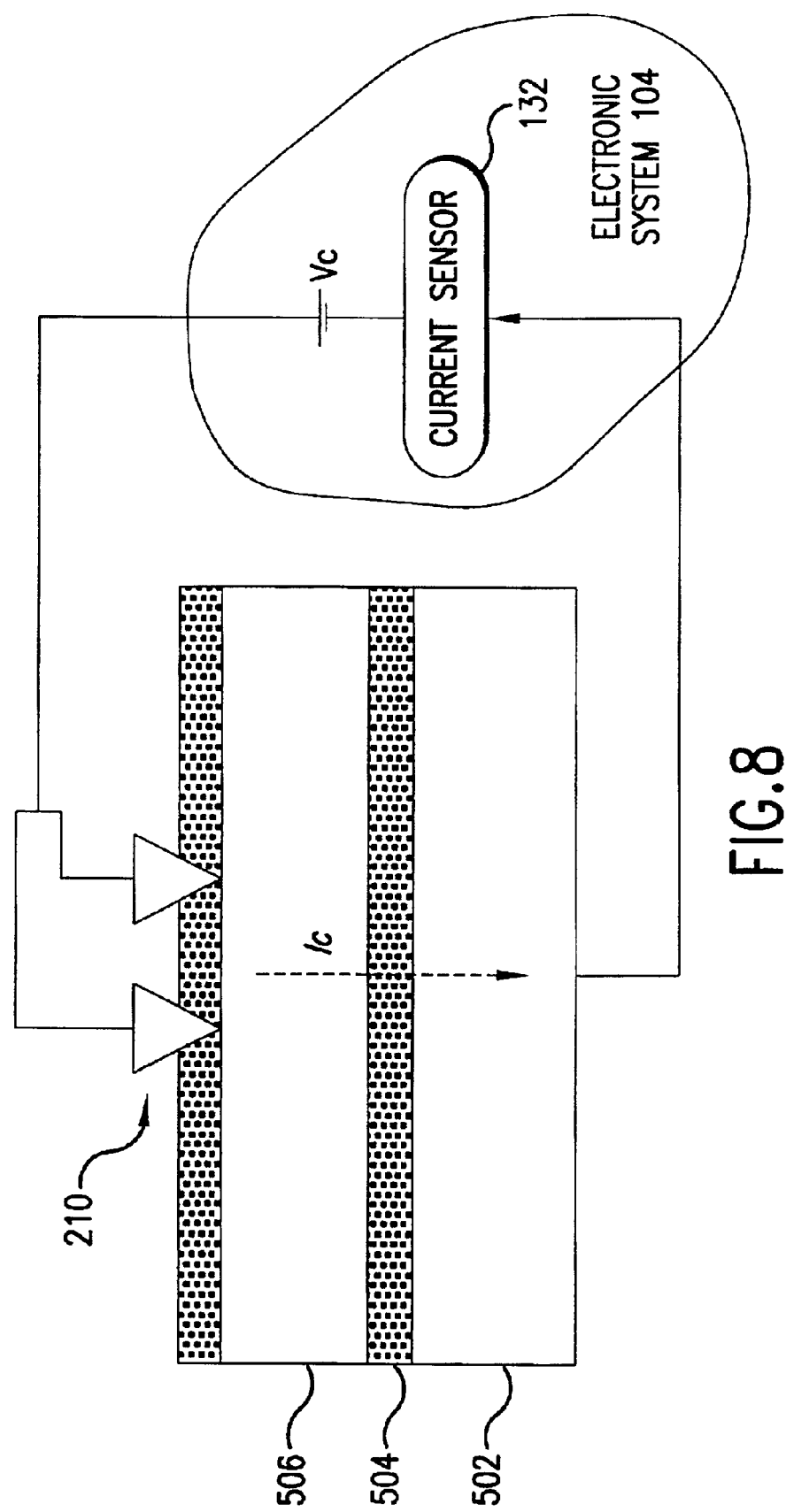
FIG. 8 illustrates, schematically, a conductive AFM measurement.

FIG. 8 illustrates, schematically, how the conductive AFM measurement may be performed at step 612 in this example. As indicated, the computer 129 operates to short the two tips 210 together. Additionally, the computer 129 makes use of the voltage source 130 to create a second pre-determined potential (Vc) between the two tips 210 and the reference layer 502. This results in a current (Ic) being produced that passes through memory cell A.

The computer 129 makes use of the current sensor 132 to measure the value of "Ic". The computer 129 may store this measurement (which represents a conductive AFM measurement) and/or display it to the user.

The user may then make use of this measurement, for example, to determine the local conductivity and/or the electrical integrity of memory cell "A".

It is noted that in some circumstances, it may not be practical to continuously perform steps 606, 608 and 610 until the CV test is successful. For example, in some embodiments, it may be desirable to modify the process of FIG. 6A as follows:

Step #1: Receive coordinate;
Step #2: Position Probe to coordinate;
Step #3: Perform CV test;
Step #4: Perform Conductive AFM measurement; and
Step #6: Record results of CV test and Results of Conductive AFM measurement Note that the conductive AFM measurement is performed regardless of the outcome of the CV test. The result of the CV test, however, is still valuable information. For example, the results of the CV test can be used to assess the accuracy of the Conductive AFM measurement.

It is also noted that it may of interest to use a multi-tip AFM probe to manipulate a sample in various ways. For example, it may be desirable to use a multi-tip AFM probe to inject a surface current into a target area of a sample. The injected current may be an AC or a DC current. This may be done in order to induce some sort of response and/or create some sort of effect. For example, it may be of interest to measure the response of various biological samples, nanotube structures, etc., to a highly localized electrical surface current. In other examples, the injected current may be used to induce a response in certain types of samples (e.g., magnetized samples) in accordance with the Hall effect and/or the Anisotropic Magneto resistance (AMR) effect. Consider the following example.

Figure 9:
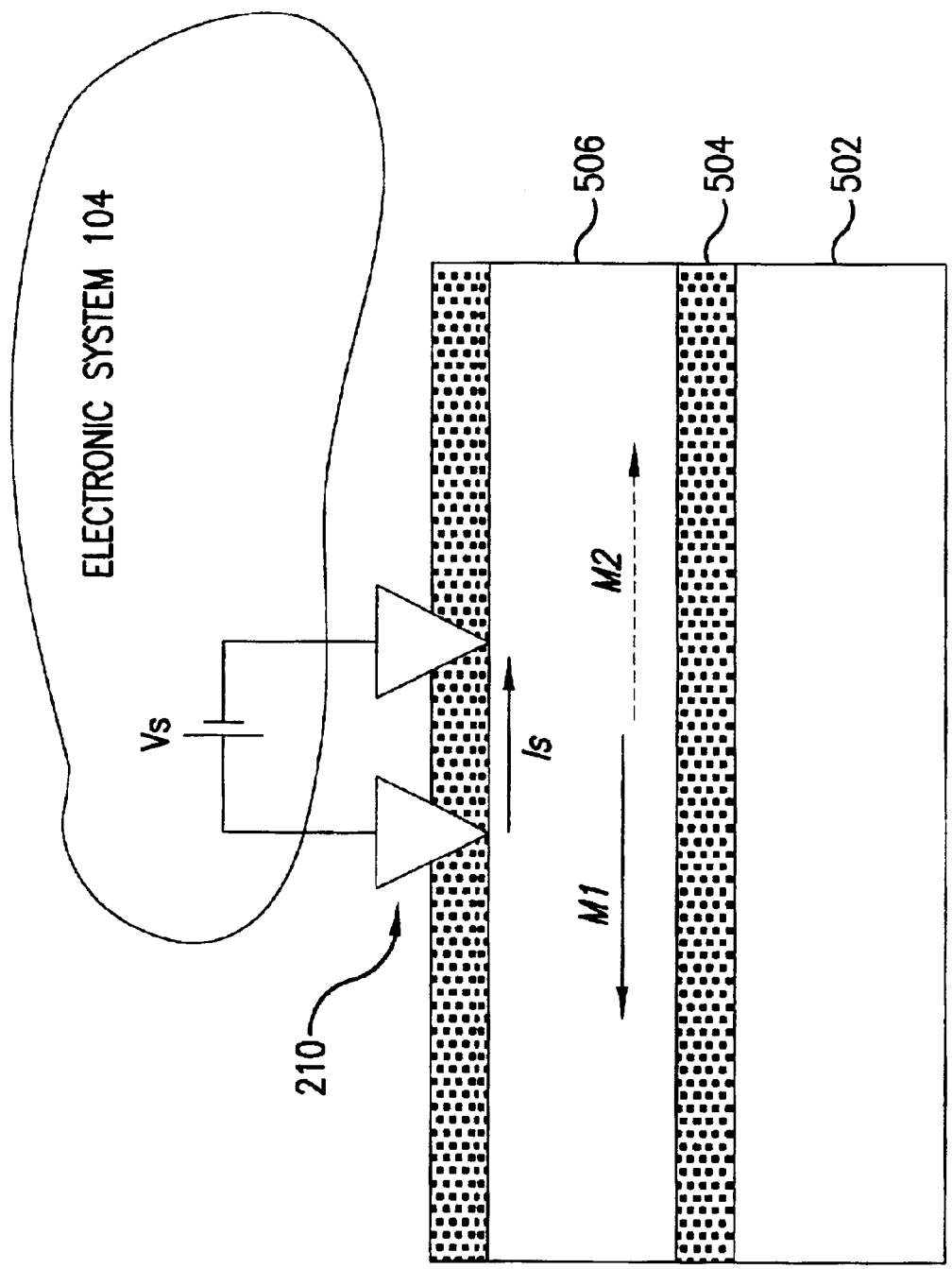
FIG. 9 illustrates the AFM probe in contact with a data storage layer of the MRAM memory cell.

In a second non-limiting example, it is assumed the user wishes to use the multi-tip probe 106 to switch the magnetic orientation (M1) of the data storage layer 506. FIG. 9 illustrates the two tips 210 in contact with the data storage layer 506.

With the two tips 210 positioned as shown, the computer 129 operates to apply a pre-determined potential (Vs) across the two tips 210. The value of Vs is selected in order to cause a surface current (Is) to flow through the data storage layer 506. This current results in a local magnetic field being generated. The magnetic field is of a suitable magnitude and orientation so as to cause the magnetic orientation of the data storage layer 506 to switch its present orientation (M1) to a different orientation (M2). This results in switching memory cell A from an "On" state to an "Off" state or visa versa.

After the magnetic orientation of the storage layer 506 is changed, a measurement or other task can then be performed upon memory cell A. For example, it may be desirable to perform a first conductive AFM measurement upon memory cell A when the cell is in an "On" state and a second conductive AFM measurement when the cell is in an "OFF" state. The two measurements can then be compared.

Figure 10A:
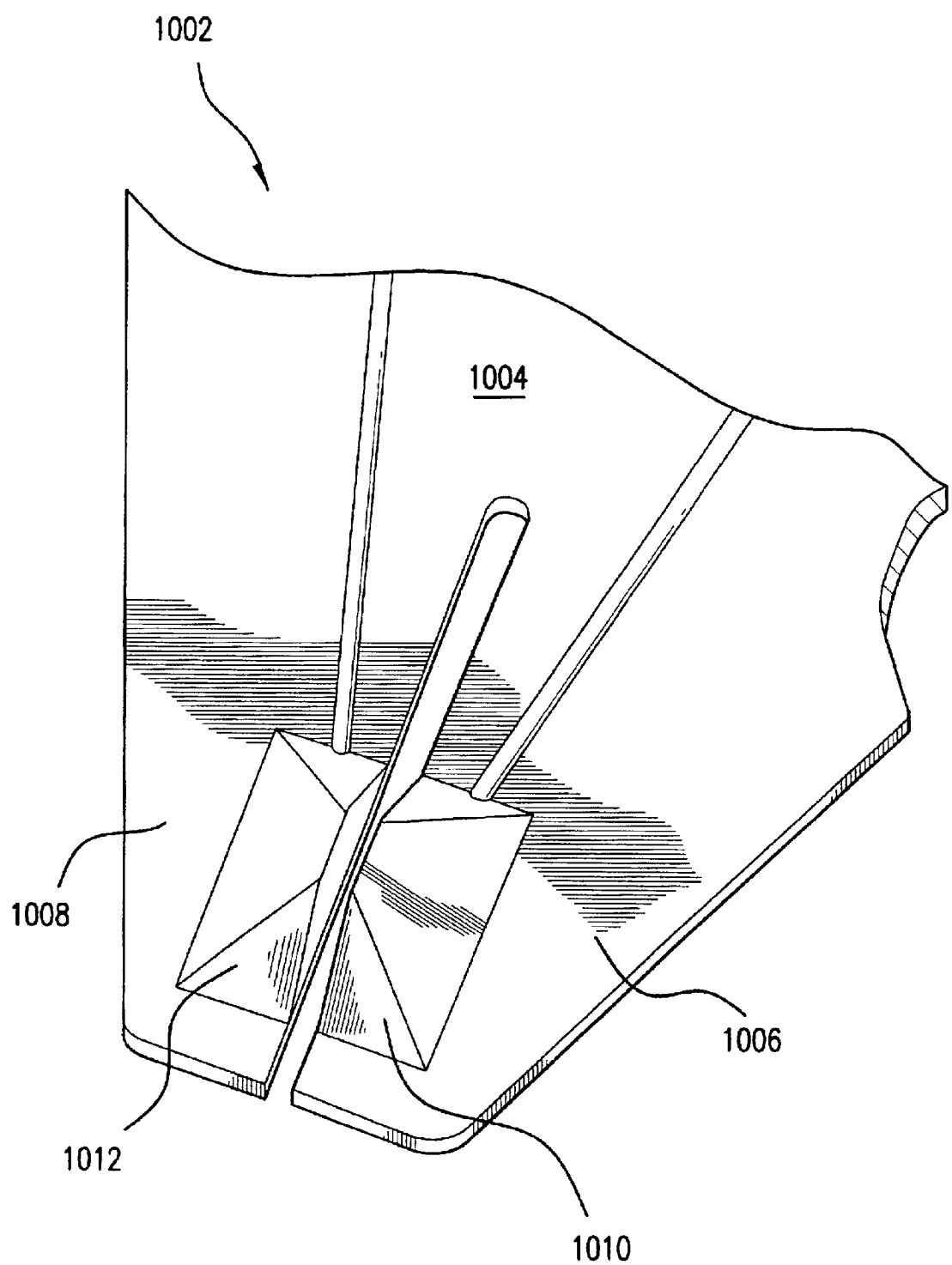
FIG. 10A illustrates a second AFM probe according to another embodiment of the invention.
Figure 10B:
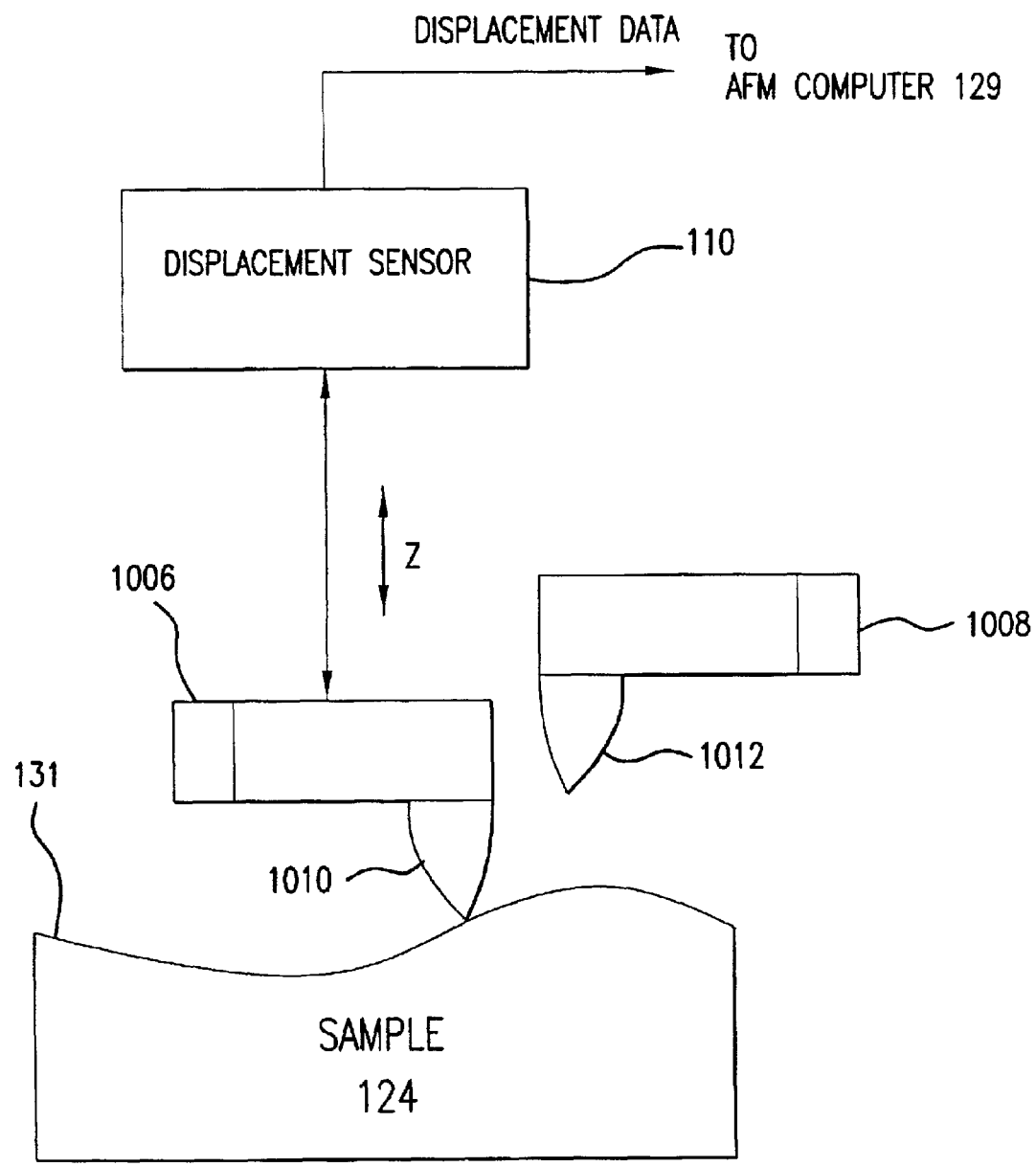
FIG. 10B illustrates how the second AFM probe may be used to measure the surface topography.

FIG. 10A illustrates an AFM probe 1002 that represents yet another embodiment of the invention. In this example, the AFM probe 1002 includes a cantilever arm 1004 that is physically split. As shown, the cantilever arm 1004 includes a first arm section 1006 and a second arm section 1008. The first arm section 1006 includes a first tip 1010. The second arm section 1008 includes a second tip 1012. The two arm sections are configured so that the first tip 1010 is slightly offset from the second tip 1012. FIG. 10B provides a better view of the offset.

FIG. 10B is used to illustrate how the AFM 102 may use the AFM probe 1002 to measure the surface topography of the sample 124. In this example, the AFM 102 scans the probe 1002 so that the first tip 1010 interacts with the sample surface 131. As the AFM probe 1002 is scanned over the surface 131, the displacement sensor 110 measures the deflection of the first arm section 1006. This information is transmitted to the computer 129. The computer 129 converts this information to data (topography data) that describes the topography of the surface 131.

Note that the surface topography data corresponds to the displacement of the first tip 1010 as the probe 1002 is scanned over the surface 131. The second tip 1012, is essentially along for the ride when the topography data is generated. The second tip 1012, however, can be utilized to verify probe contact with the sample surface 131 when the probe 1002 is used to perform other tasks. This is explained below.

Figure 10C:
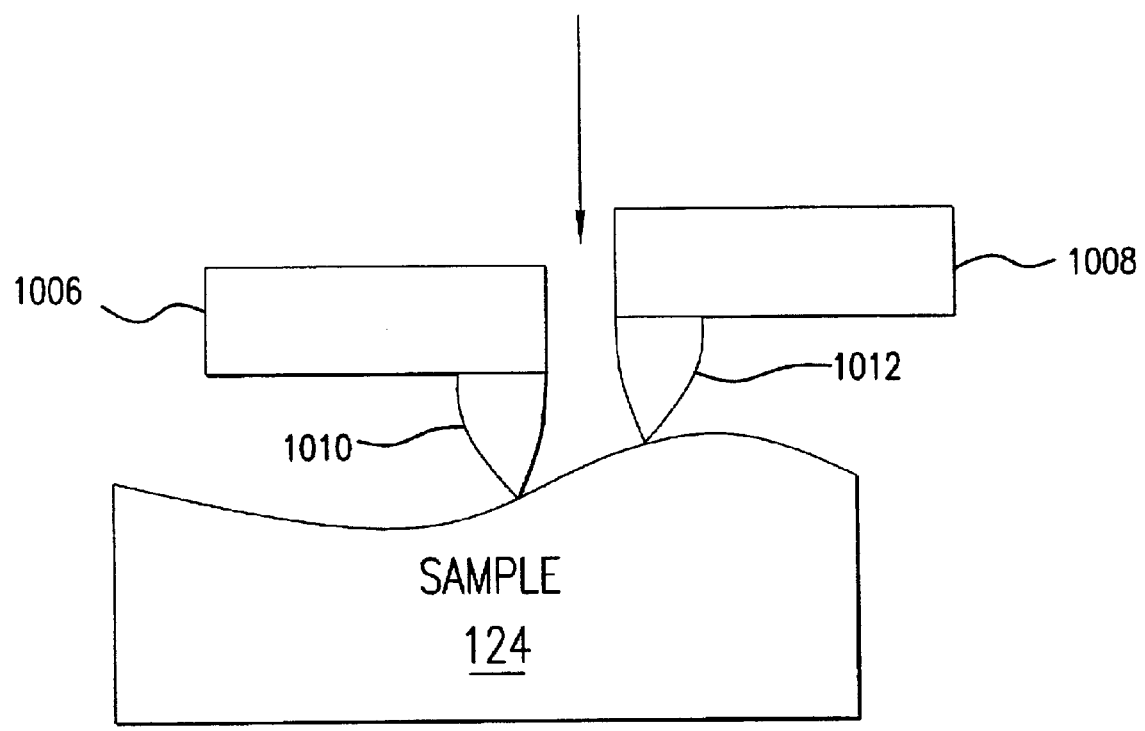
FIG. 10C illustrates how the second AFM probe can be used to verify probe contact with a sample surface.

FIG. 10C illustrates how the AFM probe 1002 can be used to verify probe contact with the sample surface 131. As the probe 1002 is moved towards the sample surface 131, the first tip 1010 eventually contacts the sample surface 131. As the probe 1002 is moved further towards the sample surface 131, the first arm section 1006 bends so as to allow the second tip 1012 to also contact the sample surface 131.

When the second tip 1012 is positioned as shown in FIG. 10C, probe contact can be verified by applying a voltage across the two tips and then measuring the current flowing from one tip to the other through the sample 124.

Figure 11:
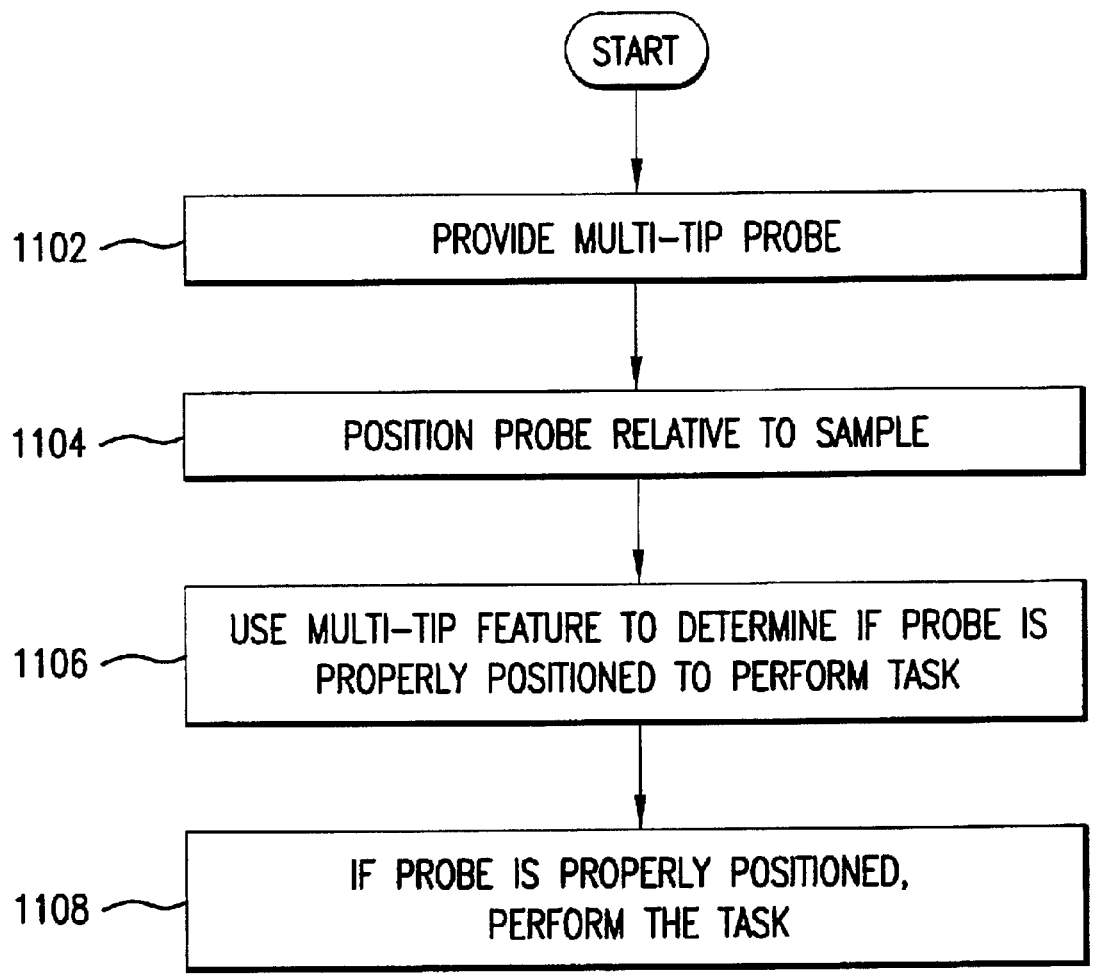
FIG. 11 is a flow diagram illustrating a separate and independent embodiment of the invention in the form of a method of using an atomic force microscope to perform a task.

FIG. 11 is a flow diagram illustrating yet another embodiment of the invention in the form of a method of using an atomic force microscope to perform a task. Referring now to FIG. 11, wherein the AFM is provided a multi-tip probe having at least a first and a second tip (step 1102). At step 1104, the probe is positioned relative to a sample so as to position the first tip and the second tip to a first position. This step may be accomplished by moving the sample and/or the probe.

At step 1106, the multiple tip feature of the probe is used to determine if the probe is properly positioned to perform the task. If it is determined that the probe is properly positioned, the task is performed (step 1108).

It is important to also note that the present invention may also be embodied in the form of a "computer readable medium" that stores (either temporarily or permanently) one or more programs. For example, a computer may include one or more programs that can orchestrate the steps depicted in the flow diagrams. A computer readable medium that includes these one or more programs represents an embodiment of the invention.

It is also noted that the phrase "computer readable medium" can refer to any medium that can contain, store or propagate computer readable instructions. Thus, in this context, computer readable medium may refer to a medium such as a CD ROM or to signals that are used to communicate the computer readable code over a network, such as the Public Internet. A computer readable medium may also refer to a carrier wave.

From the foregoing it will be appreciated that the AFM described above represents a significant advance in the art of atomic force microscopy. A person skilled in the art having benefit of this disclosure will recognize many uses for the AFM just described in many diverse fields from semiconductor analysis to biological research.

Although a specific embodiment of the invention has been described and illustrated, the invention is not to be limited to the specific forms or arrangements of parts so described and illustrated. For example, in the AFM 102 described above, the probe is moved with respect to the sample and the sample is stationary. In other embodiments, the probe is stationary and the sample is moved with respect to the probe. Also, in the examples described above the probe tip has just two tips. A probe with more than two tips is also contemplated. Accordingly, the invention is limited only by the claims.

We claim:

1. An atomic force microscope, comprising:
    a probe having a cantilever portion and a first and a second tip each extending from the cantilever portion;
    means for positioning the probe with respect to a target area of the sample, where the target area is covered with an oxide layer;
    means for impressing a pre-determined potential across the first tip and the second tip; and
    means for detecting if at least a threshold level of current is flowing between the first tip and the second tip in order to determine if the first tip and the second tip are each in contact with the target area.

2. The atomic force microscope of claim 1, wherein the first tip and the second tip are each electrically isolated from the other.

3. The atomic force microscope of claim 1, wherein the first tip and the second tip are each electrically conductive; and
    wherein the first tip and the second tip are each electrically isolated from the other.

4. The atomic force microscope of claim 1, wherein the first tip and the second tip are each electrically isolated from the other; and wherein the detecting means measures the level of current flowing between the first tip and the second tip and provides the measurement to a user.

5. The atomic force microscope of claim 1, further comprising:
    means for using the probe to perform a conductive AFM measurement when the probe is in contact with the target area.

6. The atomic force microscope of claim 1, further comprising:
    means for scanning the probe relative to a surface of the sample;
    means for generating data representative of the topography of the sample in relationship to the deflection of the cantilever portion as the probe is scanned; and
    means for using the probe to perform a conductive AFM measurement.

* * * * *